Figure 1:
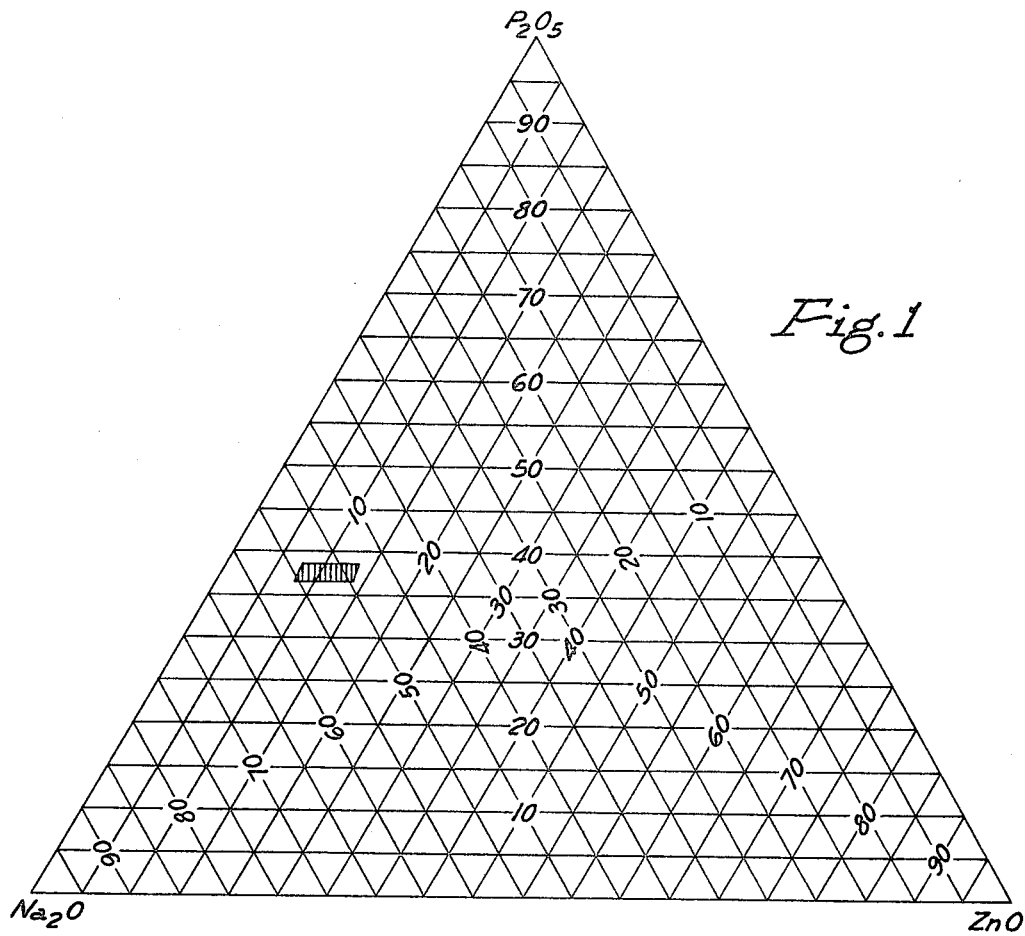

INVENTOR.
GEORGE B. HATCH
BY
William L. Krayer.
ATTORNEY.

United States Patent Office 3,284,368
Patented Nov. 8, 1966

3,284,368
PHOSPHATE GLASS COMPOSITION
George B. Hatch, Allison Park, Pa., assignor to
Calgon Corporation
Filed Apr. 3, 1964, Ser. No. 357,034
4 Claims. (Cl. 252—389)

This invention relates to readily soluble phosphate glasses for use in inhibiting corrosion in water systems. In particular, it relates to readily soluble sodium-zinc phosphate glasses as new compositions of matter.

It has long been known that sodium metaphosphate glasses may be used in low concentrations to form a protective film on metal surfaces, resulting in effective inhibition of corrosion. See, for example, U.S. Patent 2,337,856 of which I am co-inventor.

It also has been known for a number of years that the incorporation of zinc in a phosphate glass enhances its corrosion inhibitive properties to a pronounced degree. Zinc added either as the oxide or as a phosphate can readily be incorporated in a slowly soluble phosphate glass (i.e. controlled solution rate glasses). One such glass was described in U.S. Patent 2,337,856, while others are considered in U.S. Patents 2,539,305 and 2,601,395. The slowly soluble phosphate glasses are well suited for treatment of small installations (e.g. domestic or small industrial water systems) where simple passage of the water through a column of the sized slowly soluble glass can be regulated to dispense the material to the water at the concentrations within the desired range. Such a system is not suited for large systems, either municipal or industrial, as the size of the column of slowly soluble phosphate glass becomes excessive. In addition, the savings in the cost of the phosphate glass which result from precise control of the level fed to the system soon overshadow the initial cost for precision feed equipment in these large systems. For such systems a rapidly soluble zinc-bearing phosphate glass which can readily be fed from solution is preferable (i.e. to the slowly soluble glass). Heretofore, it has not been found possible to incorporate the desired amount of zinc in a phosphate glass without retardation of the solution rate to an undesirable extent. The level of zinc desired in terms of zinc oxide runs from about 7 to 12.5% of the glassy phosphate by weight with optimum of 9 to 12.5%. A glass of the molar composition $$1.1Na_2O \cdot 0.016K_2O \cdot 0.37ZnO \cdot P_2O_5$$

containing 12.5% by weight of zinc oxide has been used commercially for corrosion control, but has proved of very limited applicability due to its slow rate of solution. The metal oxide to $P_2O_5$ mole ratio of this glass is 1.5:1. A somewhat more rapid rate of solution was obtained with the glass of the molar composition $$1.1Na_2O \cdot 0.29ZnO \cdot P_2O_5$$

which contains 10% zinc oxide by weight. The metal oxide to $P_2O_5$ mole ratio of this glass is 1.39:1. The solution rate of this glass was still undesirably low and restricted its commercial applicability. One to 2% solutions of this glass can be prepared readily in moderate temperature water (60–80° F.). Much higher concentrations are unstable and soon tend to precipitate a second liquid phase. For very large installations this concentration limitation necessitates the use of undesirably large feed solution tanks. The rate of solution of this glass falls off markedly as the temperature decreases and becomes too slow for preparation of the feed solutions within in a reasonable time at much below 60° F. In short, this glass has a solution rate which barely suffices for large installations even under optimum conditions. In many cases such as the cool waters which prevail in the northern United States, solution rates of such zinc-bearing glasses are too low to permit their use in large systems.

I have found that readily soluble phosphate glasses containing about 7% to about 12% by weight of zinc oxide can be prepared by maintaining the total metal oxide to $P_2O_5$ ratio in the range of about 1.60:1 to about 1.75:1, preferably at about 1.67:1. Ratios lower than 1.60:1 result in excessive retardation of solution rate, while ratios higher than 1.75:1 markedly increase the difficulties of attaining glassy products. Zinc oxide levels of at least about 7% by weight, and preferably 9% by weight or above, are required to provide the desired enhancement of the corrosion inhibitive properties of the phosphate glass. This corresponds to a zinc oxide to sodium oxide ratio of at least 1:7 and preferably 1:5 or above. Thus, it may be said that my invention contemplates a sodium-zinc glassy phosphate having a mole ratio of metal oxide to $P_2O_5$ of from about 1.60:1 to about 1.75:1 and a mole ratio of zinc oxide to sodium oxide of from about 1:7 to about 1:3.5, preferably from 1:5 to 1:3.5.

A very useful glass within the above-described terms is one having the composition $4Na_2O \cdot ZnO \cdot 3P_2O_5$. In terms of weight the composition may be stated as 32.8% $Na_2O$, 10.8% $ZnO$, and 56.4% $P_2O_5$. This and the other glasses in this series may be prepared by dehydration of mixtures of suitable proportions of zinc oxide, soda ash and phosphoric acid followed by fusion at about 800° C. or above and subsequent rapid cooling of the resultant melt.

Tables I and II demonstrate, respectively, the influence of metal oxide to $P_2O_5$ ratio on the solution rate of 8 to 12 mesh sodium-zinc phosphate glasses, and the influence of zinc oxide to sodium oxide ratio on the solution rate of 8 to 12 mesh phosphate glasses having a metal oxide to $P_2O_5$ ratio of 1.67:1. The tables demonstrate the relatively narrow range of compositions offering both the desired zinc content and the desired ratio of solution.

TABLE I.—INFLUENCE OF METAL OXIDE TO $P_2O_5$ RATIO ON THE SOLUTION RATE OF 8 TO 12 MESH SODIUM-ZINC ($Na_2O:ZnO=4:1$) PHOSPHATE GLASSES IN TAP WATER AT 5° C.

| $MO:P_2O_5$ (mole ratio): | Solution rate (mg./gm./15 min.) |
|---|---|
| 1.5 | 120.0 |
| 1.6 | 196.0 |
| 1.67 | 222.0 |
| 1.75 | 298.0 |

TABLE II.—INFLUENCE OF ZINC OXIDE TO SODIUM OXIDE RATIO ON THE SOLUTION RATE OF 8 TO 12 MESH PHOSPHATE GLASSES ($MO:P_2O_5=1.67:1$) IN TAP WATER AT 5° C.

| $ZnO=Na_2O$ (mole ratio) | ZnO Weight percent | Solution Rate (mg./gm./15 min.) |
|---|---|---|
| 1:2 | 17.7 | 0.8 |
| 1:3 | 13.4 | 7.7 |
| 1:4 | 10.8 | 222.0 |
| 1:5 | 9.0 | 485.0 |
| 1:7 | 6.8 | 994.0 |

FIGURE 1 is a triangular coordinate plot of my preferred zinc-sodium phosphate glasses in terms of mol percent. The shaded area is of course the range of compositions of my invention.

Figure 2:
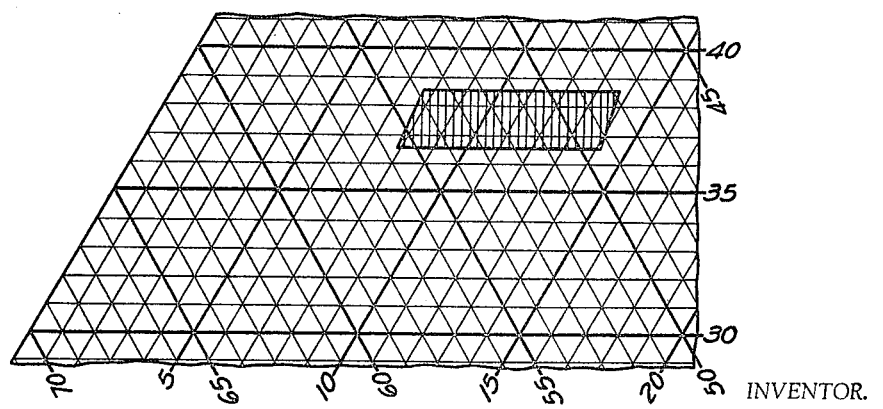

An enlargement of the shaded area is shown in FIGURE 2. The four corners of the quadrilateral figure are (a) 53.8% $Na_2O$, 7.7% $ZnO$, 38.5% $P_2O_5$; (b) 55.6% $Na_2O$, 7.9% $ZnO$, 36.5% $P_2O_5$; (c) 49.4% $Na_2O$, 14.1% $ZnO$, 36.5% $P_2O_5$; (d) 47.8% $Na_2O$, 13.7% $ZnO$; 38.5%

$P_2O_5$. Any glassy composition within the confines of this figure is contemplated in my invention.

I claim:

1. A phosphate glass consisting essentially of MO and $P_2O_5$ in a mol ratio of from about 1.60:1 to about 1.75:1, in which MO comprises $Na_2O$ and ZnO in a mol ratio of from about 3.5:1 to about 7:1.

2. A glassy composition comprising zinc oxide, sodium oxide, and $P_2O_5$ in proportions such that, when the composition is plotted in terms of mol percent on triangular coordinates, it lies within the quadrangle defined by the points (a) 53.8% $Na_2O$, 7.7% ZnO, 38.5% $P_2O_5$; (b) 55.6% $Na_2O$, 7.9% ZnO, 36.5% $P_2O_5$; (c) 49.4% $Na_2O$, 14.1% ZnO, 36.5% $P_2O_5$, (d) 47.8% $Na_2O$, 13.7% ZnO, 38.5% $P_2O_5$.

3. A glassy composition having an MO:$P_2O_5$ mol ratio of about 1.67:1, where MO is sodium oxide and zinc oxide in a mol ratio of about 4:1.

4. A glassy composition consisting essentially of MO and $P_2O_5$ in a mol ratio of from about 1.60 to about 1.75:1, in which MO comprises $NaO_2$ and ZnO in a mol ratio of from about 3.5:1 to about 5:1.

References Cited by the Examiner

UNITED STATES PATENTS 2,601,395　6/1952　Hatch _____ 21–2.7 XR
3,116,105　12/1963　Kerst _____ 21—2.7

LEON D. ROSDOL, *Primary Examiner.*

M. WEINBLATT, *Examiner.*